US009055266B2

United States Patent
Asakura (10) Patent No.: US 9,055,266 B2
(45) Date of Patent: Jun. 9, 2015

(54) APPARATUS AND METHOD FOR COLOR IMAGE COMPRESSION BY COMPARING MONOCHROME COMPRESSION DATA

(71) Applicant: Konica Minolta, Inc., Tokyo (JP)

(72) Inventor: Shinya Asakura, Kawasaki (JP)

(73) Assignee: KONICA MINOLTA, INC. (JP)

( * ) Notice: Subject to any disclaimer, the term of this patent is extended or adjusted under 35 U.S.C. 154(b) by 45 days.

(21) Appl. No.: 13/954,807

(22) Filed: Jul. 30, 2013

(65) Prior Publication Data

US 2014/0036326 A1 Feb. 6, 2014

(30) Foreign Application Priority Data

Aug. 6, 2012 (JP) ................................. 2012-174439

(51) Int. Cl.
| | |
|---|---|
| G06K 9/36 | (2006.01) |
| H04N 1/64 | (2006.01) |
| H04N 1/41 | (2006.01) |
| H04N 19/50 | (2014.01) |
| H04N 19/176 | (2014.01) |
| H04N 19/70 | (2014.01) |
| H04N 19/103 | (2014.01) |
| H04N 19/186 | (2014.01) |
| H04N 19/90 | (2014.01) |

(52) U.S. Cl.
CPC . *H04N 1/64* (2013.01); *H04N 1/41* (2013.01); *H04N 1/644* (2013.01); *H04N 19/50* (2014.11); *H04N 19/176* (2014.11); *H04N 19/70* (2014.11); *H04N 19/103* (2014.11); *H04N 19/186* (2014.11); *H04N 19/90* (2014.11)

(58) Field of Classification Search
None
See application file for complete search history.

(56) References Cited

U.S. PATENT DOCUMENTS

| 7,840,063 B2 * | 11/2010 | Koyanagi et al. | 382/162 |
| 8,259,356 B2 * | 9/2012 | Ohkawa | 358/2.1 |
| 2010/0316291 A1 * | 12/2010 | Deng et al. | 382/166 |

FOREIGN PATENT DOCUMENTS

JP  2007-028408  2/2007

OTHER PUBLICATIONS

Rasche et al., "Detail Preserving Reproduction of Colour Images for Monochromats and Dichromats," IEEE Computer Graphics and Applications, vol. 25, No. 3, pp. 22-30, May/Jun. 2005.*

* cited by examiner

*Primary Examiner* — Bhavesh Mehta
*Assistant Examiner* — Feng Niu
(74) *Attorney, Agent, or Firm* — Squire Patton Boggs (US) LLP

(57) ABSTRACT

Provided are an image processing apparatus and an image processing method, for compressing an image by using a representative-color-based compression which includes dividing an image to be compressed into plural blocks, extracting representative colors from each of the blocks, and assigning each pixel in the blocks one of the representative colors. The image processing apparatus includes: a compressing section configured to perform the following operations. The operations include generating color compression data by performing a representative-color-based compression on a color input image, generating first monochrome compression data by performing a monochrome conversion of representative colors extracted in the generating the color compression data, generating second monochrome compression data by performing a monochrome conversion and then a representative-color-based compression on the color input image, generating difference data by comparing the first and second monochrome compression data, and outputting the color compression data and the difference data.

9 Claims, 10 Drawing Sheets

APPARATUS AND METHOD FOR COLOR IMAGE COMPRESSION BY COMPARING MONOCHROME COMPRESSION DATA

This application is based on Japanese Patent Application No. 2012-174439 filed on Aug. 6, 2012, in the Japan Patent Office, the entire content of which is hereby incorporated by reference.

TECHNICAL FIELD

The present invention relates to an image processing apparatus and image processing method. In particular, the present invention relates to an image processing apparatus and image processing method which employ a compression technique configured to compress images by replacing colors of an image with representative colors.

BACKGROUND

In image forming apparatuses, such as a Multi Function Peripheral (MFP), images of a manuscript read by using a scanner function can be printed, or transmitted via FAX. Here, at the time of reading a manuscript, there may be a case where whether the manuscript is a color manuscript or a monochrome manuscript cannot be judged until the read-in of images corresponding in amount to one page has been completed. Further, there may be a case where whether to output the read-in images in a color mode or a monochrome mode is set later on.

Therefore, according to one of currently-used methods, at the time of reading of a manuscript, both a color image and a monochrome image are stored in a memory, and thereafter, at a time point when whether to process the read image as a color image or a monochrome image is determined, the unnecessary image is eliminated from the memory. However, in this method, the memory is required to have a sufficient amount of usable memory space. Accordingly, there is a problem that memory resources cannot be utilized effectively.

With regard to such a problem, for example, Japanese Unexamined Patent Publication (JP-A) No. 2007-28408 discloses an image processing apparatus which includes an image input section, a color image producing section, a monochrome image producing section, a synthesizing section, a buffer section, a judging section, and an output control section. In the image processing apparatus, the above sections are configured to act as follows. The image input section inputs image data of a manuscript image. The color image producing section produces color image data by performing color image processing for the image data of the manuscript image. On the other hand, the monochrome image producing section produces monochrome image data with a bit size per one pixel smaller than that of the color image data by performing monochrome image processing for the image data of the manuscript image. The synthesizing section produces synthesized-image data with a bit size per one pixel equal to that of the color image data by synthesizing the monochrome image data with the color image data. The buffer section stores temporarily image data. The judging section judges whether the manuscript image is a color image or a monochrome image based on the image data of the manuscript image. The output control section controls image output processing for an external section in response to a designated mode. When the designated mode is an automatic color selection mode, the output control section makes the buffer section store the image data output from the synthesizing section. Further, when the judging section judges that the manuscript image is a color image, the output control section takes out the image data from the buffer section and outputs the image data. Meanwhile, when the judging section judges that the manuscript image is a monochrome image, the output control section extracts the monochrome image data from the image data taken out from the buffer section and outputs the monochrome image data.

In JP-A No. 2007-28408, at the time of image processing, two frames of a color frame and a monochrome frame are produced and the least significant bit of the color difference component of the color frame is replaced with a bit corresponding to a monochrome binary image. Subsequently, when the finally-used image is a color image, the synthesized image is outputted as it is. In the case of a monochrome frame, the least significant bit of each pixel of the synthesized image is outputted. However, this technique deals with only monochrome binary images. Accordingly, in multi-leveled monochrome images, since the number of embedded bits becomes large, this technique is hardly utilized.

Further, according to a conceivable method, in order to save memory resource, only a color image has been acquired, and subsequently, when the manuscript image is judged as a monochrome image, a monochrome image is produced from the color image. With this method, in order to save memory resource, the color image is required to be compressed so as to be stored as a compressed color image. In the case where the compressed color image is stored, a monochrome image is produced through a process of performing monochrome conversion for the compressed color image. However, the produced monochrome image is inferior in image quality as compared with a monochrome image produced from an original image.

For example, in the generally-used image compressing system, an image is divided into the specific number of blocks, representative colors are extracted for each block, and the color of each pixel in each block is replaced with one of the representative colors. In the case of performing such the representative-color-based compression, when a color which becomes a different color in a color image, but is converted into the same color in a gray scale, the number of representative colors in a gray mode decreases as a result, which causes image quality deterioration. The present invention seeks to solve the problem.

SUMMARY

There are disclosed illustrative image processing apparatuses and image processing methods.

An illustrative image processing apparatus reflecting one aspect of the present invention is an image processing apparatus comprising a compressing section configured to perform the following operations. The operations comprise: generating color compression data by performing a representative-color-based compression on a color input image, and generating first monochrome compression data by performing a monochrome conversion of representative colors extracted in the generating the color compression data. The operations further comprise: generating second monochrome compression data by performing a monochrome conversion and then a representative-color-based compression on the color input image. The operations further comprise: generating difference data by comparing the first monochrome compression data and the second monochrome compression data, and outputting the color compression data and the difference data. Herein, the performing the representative-color-based compression includes dividing an image to be compressed into a plurality of blocks, extracting representative colors from each of the blocks, and assigning each pixel in the blocks one of the representative colors.

An illustrative image processing method reflecting one aspect of the present invention is an image processing method comprising performing compressing operations and restoring operations. The compressing operations include: generating color compression data by performing a representative-color-based compression on a color input image, and generating first monochrome compression data by performing a monochrome conversion of representative colors extracted in the generating the color compression data. The compressing operations further include: generating second monochrome compression data by performing a monochrome conversion and then a representative-color-based compression on the color input image. The compressing operations further include: generating difference data by comparing the first monochrome compression data and the second monochrome compression data, and outputting the color compression data and the difference data. Herein, the performing the representative-color-based compression includes dividing an image to be compressed into a plurality of blocks, extracting representative colors from each of the blocks, and assigning one of the representative colors to each pixel in the blocks. The restoring operations include: receiving the color compression data and the difference data. The restoring operations further include, under a condition that the input image is to be outputted in color, expanding the color compression data to generate an output image. The restoring operations further include, under a condition that the input image is to be outputted in monochrome, generating the first monochrome compression data by performing a monochrome conversion of the representative colors of the color compression data, generating a compression data equivalent to the second monochrome compression data by applying the difference data to the first monochrome compression data, and expanding the compression data to generate an output image.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Illustrative embodiments of image processing apparatuses and image processing methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

The illustrative image processing apparatuses and illustrative image processing methods are provided in view of the above-described problem. Those embodiments allow, even in the case where representative-color-based compression is performed on a color image data and monochrome conversion is further performed on the resulting compression data, to obtain an image equivalent to an image produced by performing monochrome conversion directly on the color image data.

The reason is described below. There is provided a compression section configured to, when generating color compression data by performing a representative-color-based compression of an original color image, generate first monochrome compression data and second monochrome compression data and to output the color compression data and difference data of the first monochrome compression data and the second monochrome compression data. Herein, the first monochrome compression data is generated by performing a monochrome conversion of representative colors of the color compression data. The second monochrome compression data is generated by performing a monochrome conversion of the original color image and then performing a representative-color-based compression of the result. Additionally, there is provided a restoring section configured to, under the condition that a color image is to be outputted, expand the color compression image to generate an output image, and to, under the condition that a monochrome image is to be outputted, perform a monochrome conversion on the color compression data to generate first monochrome compression data, apply the difference data to the first monochrome compression to generate compression data equivalent to the second monochrome compression data, and expand the generated compression data to generate an output image.

Figure 1:
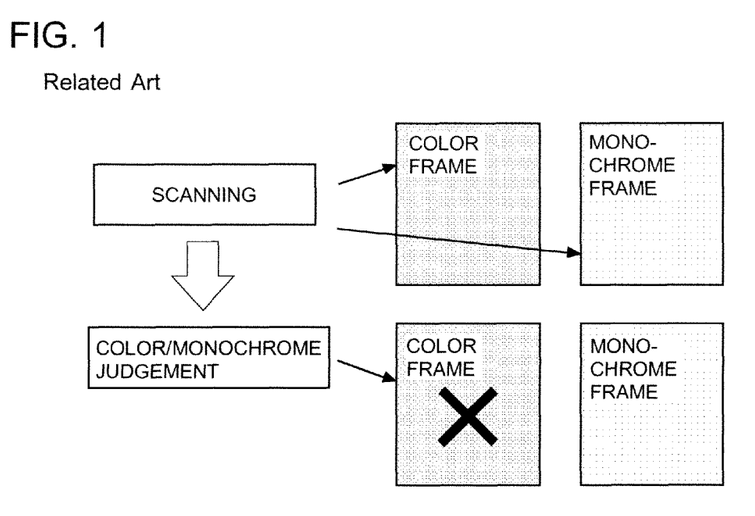
FIG. 1 is an illustration for describing a method of holding both a color frame and a monochrome frame.

In a color conversion process of a scanner, there is a case to control such that, after scanning, whether to treat the scanned image as a color image or as a monochrome image is judged, and thereafter, the following processes to be performed are determined. In such a case, as shown in FIG. 1, the color converting section of the scanner produces two kinds of images, such as RGB images (color frame) and monochrome images (monochrome frame) on a memory, and after judging which one of a color mode and a monochrome mode to be selected (color/monochrome judgment), a process to eliminate unnecessary images of the non-selected mode is performed. For example, in the case where the processing is performed in a seamless manner by a USER BOX function and the like in a MPF, after a scan operation, at a time point when post processing, such as FAX transmission, copy output, and like is determined by a user, whether the scanned image is processed as a color image or a monochrome image is determined. Accordingly, two kinds of images of a color frame and a monochrome frame are temporarily produced on a memory.

Figure 2:
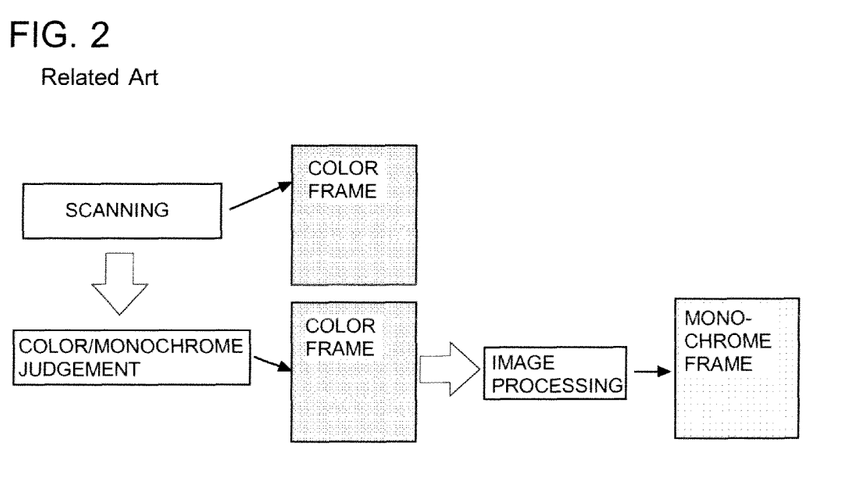
FIG. 2 is an illustration for describing a method of holding only a color frame.

However, in this method, memory efficiency is not good. Accordingly, in an embodiment provided on purpose to prioritize the memory efficiency, as shown in FIG. 2, only a color frame is produced on a memory, and after the color/monochrome judgment, if it is determined that the scanned image is to be processed as a monochrome picture, a technique to produce a monochrome frame by performing image processing again for the color frame is employed. In the case of producing a monochrome frame from the color frame, the original color frame which has reversibility for the original image may cause no problem. However, if reduction in the number of colors occurs due to nonreversible compression, there is a possibility that image quality may deteriorate at the time of production of a monochrome frame.

In view of the above matters, one embodiment of the present invention performs the following compressing operations with employing a representative-color-based compression in which an input image is divided into plural blocks with a specific size, representative colors are extracted in each of the rectangular blocks, the color of each pixel in each of the blocks is replaced with one of the representative colors, whereby the input image is compressed. When generating color compression data by performing the representative-color-based compression on a color input image, first monochrome compression data and second monochrome compression data are generated, where the first monochrome compression data is produced through a process of performing monochrome conversion of the representative colors extracted in the operation of generating the color compression data, and the second monochrome compression data is produced through a process of performing monochrome conversion on the color image so as to produce a monochrome image and, thereafter, performing the representative-color-based compression on the obtained monochrome image. Then, difference data between the first monochrome compression data and the second monochrome compression data are generated. Successively, as a compression result for the input image, two kinds of data of the above color compression data and the difference data are outputted.

Thereafter, in the restoring operations as the post processing, under the condition that the compression result is needed to be treated as color data (the input image is to be outputted in color), the color compression data is expanded to generate an output image. On the other hand, under the condition that the compression result is needed to be treated as monochrome data (the input image is to be outputted in monochrome), the first monochrome compression data is generated by performing a monochrome conversion of the representative colors of the color compression data, and a compression data equivalent to the second monochrome compression data is generated by applying the difference data to the first monochrome compression data. Then, the resulting compression data is expanded to generate an output image.

With this, as compared with the case where both the color compression data and the second monochrome compression data are held, memory resources can be saved more. In addition, since compression data equivalent to the second monochrome compression data can be acquired from the color compression data, it becomes possible to suppress image quality deterioration.

The above-described embodiment may be available in devices configured to process images by using compressed and/or expanded images, such as a printer, a scanner, a MPF and a computer apparatus. For example, the above compression operations and the restoring operations may be executed by an image processing apparatus including both of a compressing section configured to perform the compressing operations and a restoring section configured to perform the restoring operations. Alternatively, the compressing operations and the restoring operations may be executed separately by plural computer apparatuses which are connected to each other through data transfer path.

In an example that the compressing operations and the restoring resorting operations are executed by an image forming apparatus which includes a compressing section, a restoring section, an image reading section and a memory, the compressing section receives a scanned image read by the image reading section, and then, performs the compressing operations on the image data. The compressing section generates color compression data and difference data to store them to the memory. Further, the restoring section reads the color compression data and the difference data from the memory, and performs the restoring operations by using the color compression data or by using the color compression data and the difference data depending on whether the output mode of the scanned image is color or monochrome, to generate an output image.

As another example, by using the compressing operations and the restoring operations, an image displayed in a first device may be displayed in a second device. In this example, the first device performs the compressing operations on an image displayed in the first device as an input image, and transmits the generated color compression data and the difference data to the second device. Then, the second device receives the color compression data and the difference data, and performs the restoring operations depending on whether the output mode of the image displayed in the first device is a color display mode or a monochrome display mode, to generate an output image.

As another example, by using the compressing operations and the restoring operations, an image displayed in a first device can be outputted as a hard copy by a second device which is connected to a printer. In this example, when performing the restoring operations, the second device performs the restoring operations depending on whether the displayed image is to be outputted as a hard copy in color or monochrome and generate an output image.

FIRST EXAMPLE

Figure 7:
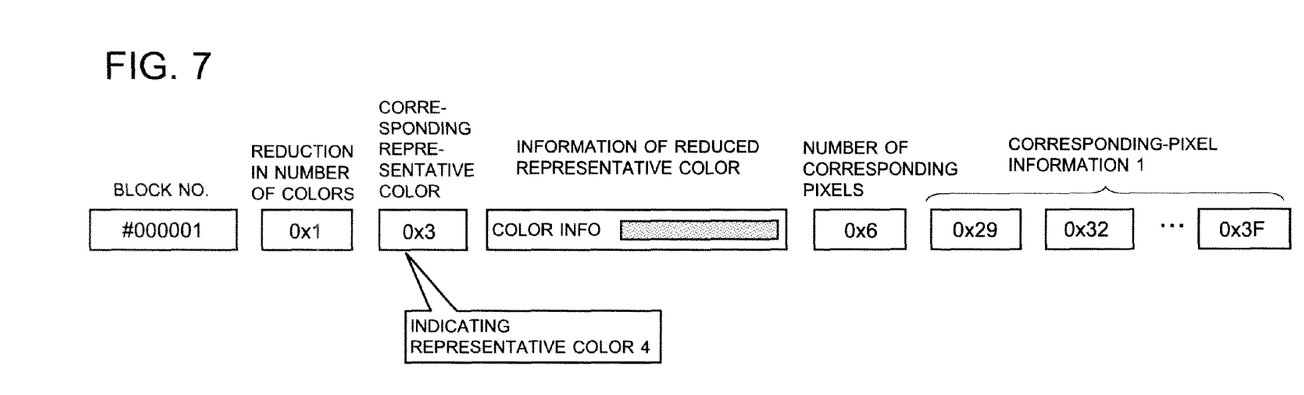
FIG. 7 is a diagram showing one example of difference information between the first monochrome representative-color-based compression data and the second monochrome representative-color-based compression data.
Figure 8:
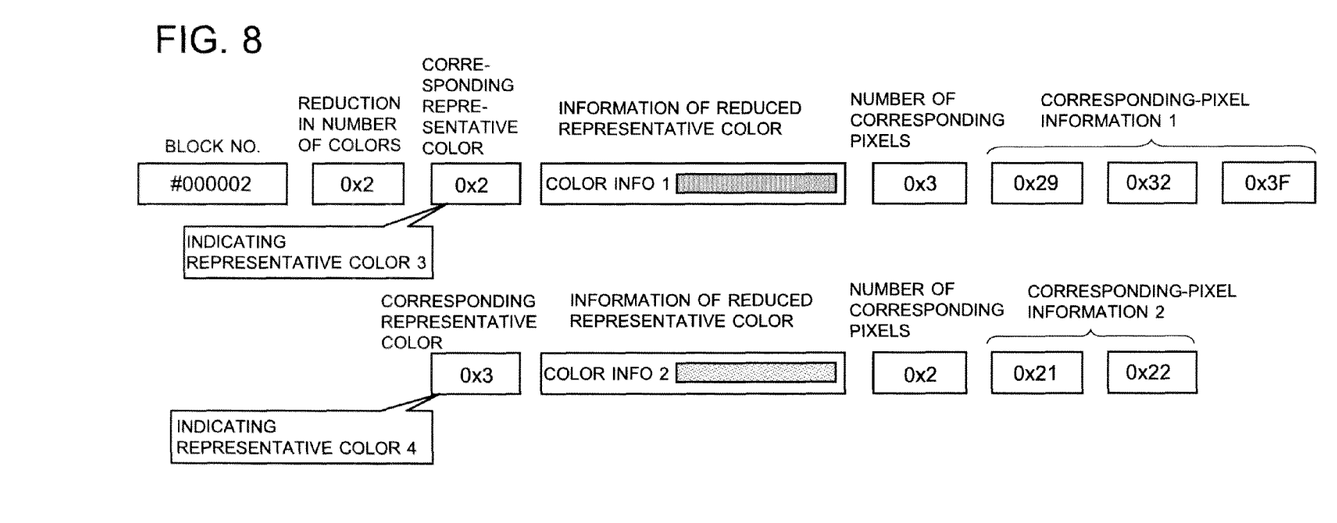
FIG. 8 is a diagram showing another example of difference information between the first monochrome representative-color-based compression data and the second monochrome representative-color-based compression data.
Figure 9:
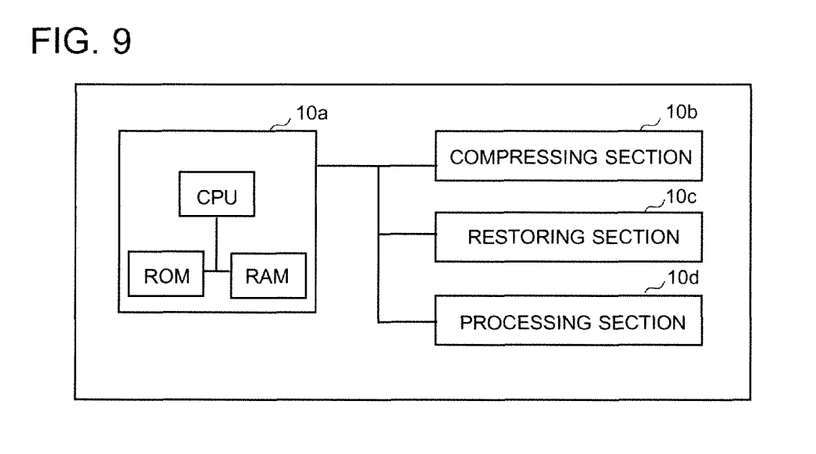
FIG. 9 is a block diagram showing a constitution of an image processing apparatus pertaining to the first example of the present invention.
Figure 10:
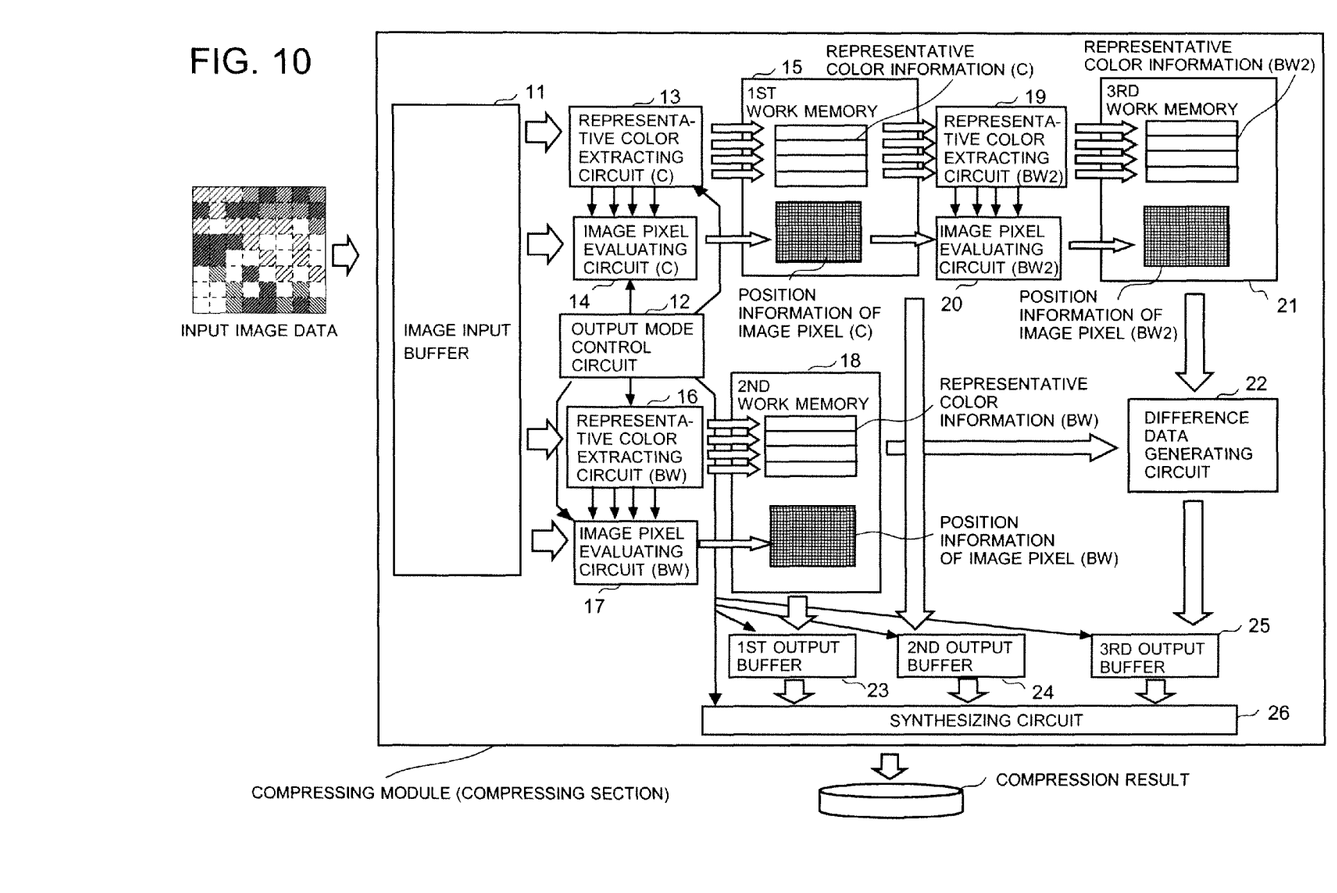
FIG. 10 is a block diagram showing a constitution of a compressing module of the image processing apparatus pertaining to the first example of the present invention.
Figure 11A:
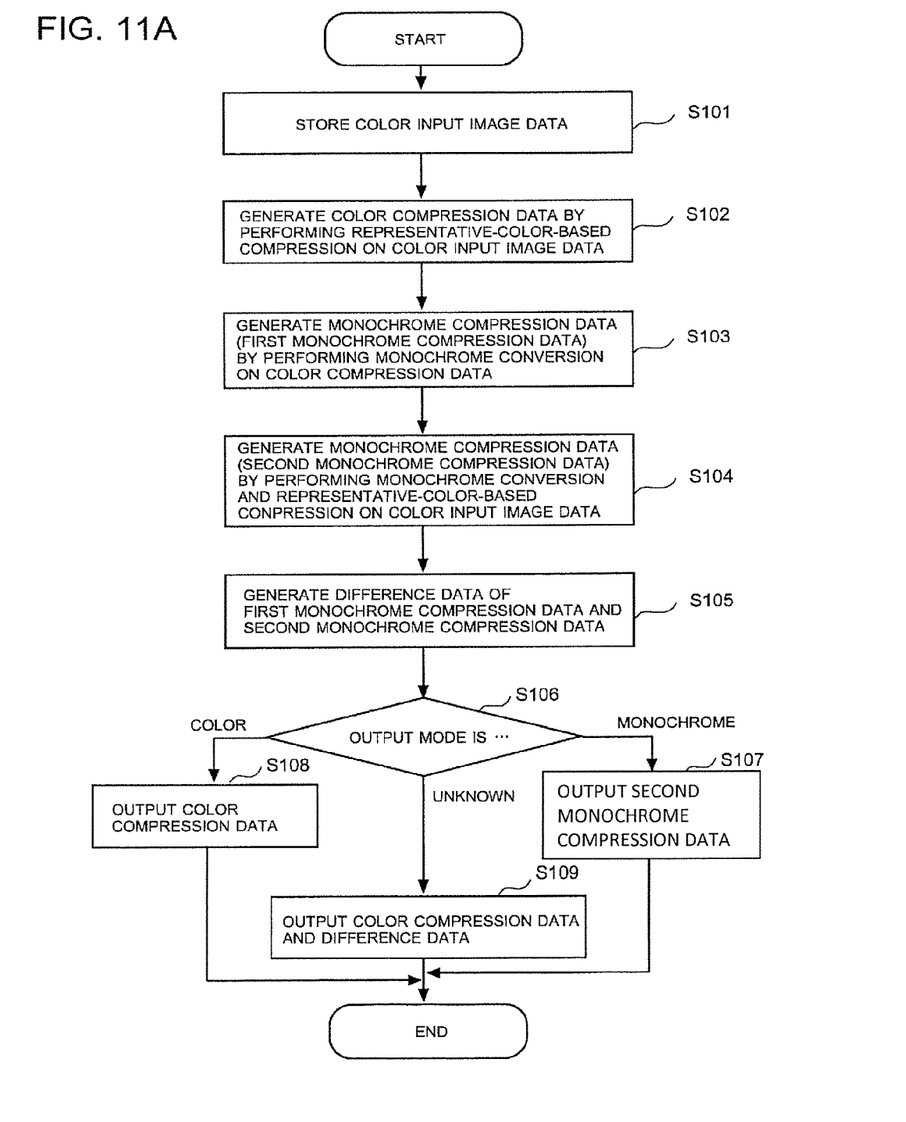
FIG. 11A is a flowchart diagram showing processing of a compressing section of the image processing apparatus pertaining to the first example of the present invention.
Figure 11B:
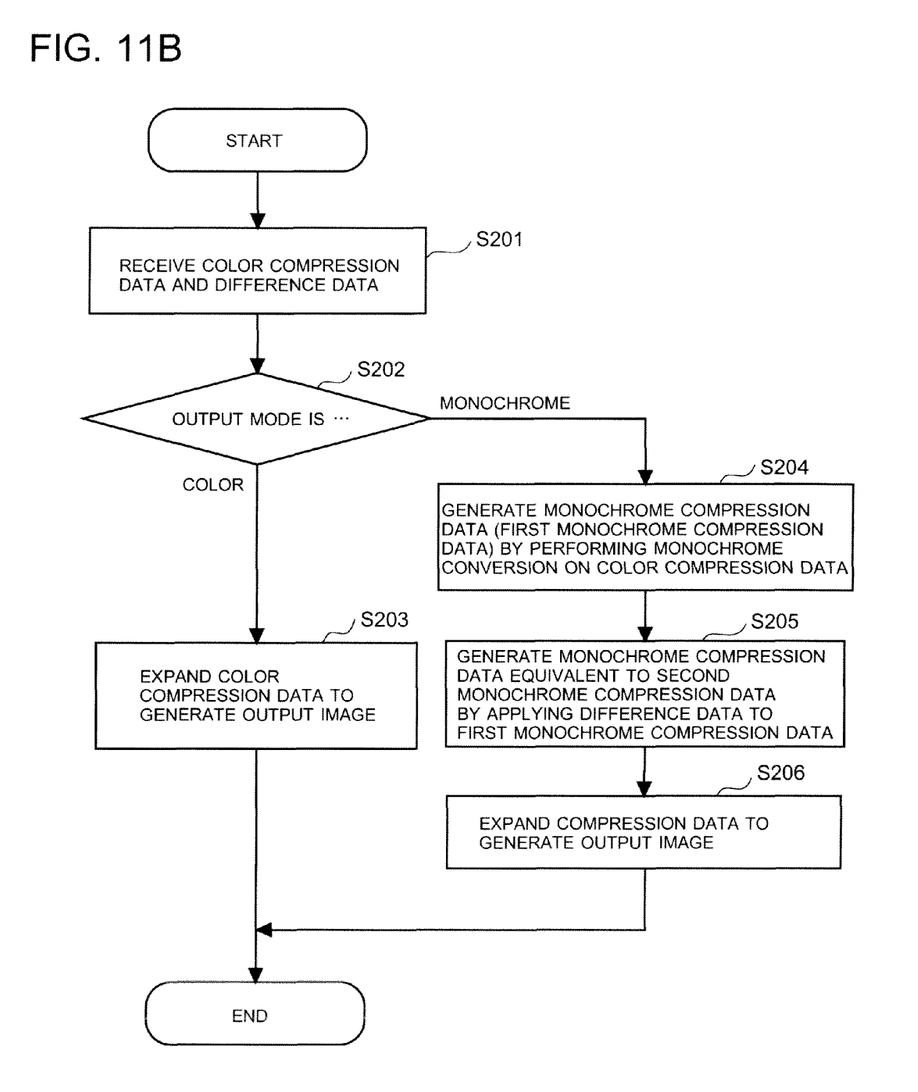
FIG. 11B is a flowchart diagram showing processing of a restoring section of the image processing apparatus pertaining to the first example of the present invention.

In order to describe the above-mentioned embodiment of the present invention in more detail, description will be given to an image processing apparatus and image processing method pertaining to the first example of the present invention with reference to FIGS. 3 to 11B. FIGS. 3 to 6 are diagrams showing respectively one example of an original color image, one example of a color representative-color-based compression image, one example of a first monochrome representative-color-based compression image, and one example of a second monochrome representative-color-based compression image. Herein, the color representative-color-based compression image is produced through a process of performing representative-color-based compression to the original color image. The first monochrome representative-color-based compression image is produced through a process of performing monochrome conversion to the color representative-color-based compression image. The second monochrome representative-color-based compression image is produced through a process of performing monochrome conversion to the original color image so as to produce a monochrome image and, thereafter, further performing representative-color-based compression to the monochrome image. Further, FIGS. 7 and 8 are illustrations showing respective examples of difference information between the first monochrome representative-color-based compression image and the second monochrome representative-color-based compression image. Furthermore, FIG. 9 is a block diagram showing a constitution of an image processing apparatus of this example, FIG. 10 is a block diagram showing a constitution of a compressing module of the image processing apparatus of this example, FIG. 11A is a flowchart diagram showing processing of a compressing section of this example, and FIG. 11B is a flowchart diagram showing processing of a restoring section of this example.

As mentioned above, as a known method of saving memory resources, the following image producing method is employed. At the time of scanning processing, only a color image is acquired and stored as color image data. Subsequently, when the scanned image is determined to be processed as a monochrome image as a result of a color/monochrome judgment, a monochrome image is produced from the color image. At this time, if the color image is stored without being compressed, an output image equivalent to a monochrome image acquired directly by scanning processing can be produced from the color image. However, since the color image has a large data size, i.e., a large quantity of image data, it is required to compress the image data of the color image and to sore the color image as a color compression image. Accordingly, when a color image is stored as compression data via representative-color-based compression, there are two cases. That is, in the first case, the color image is subjected to monochrome conversion to produce a monochrome image, and the monochrome image is subjected to representative-color-based compression to produce monochrome compression data. In the second case, the color image is subjected to representative-color-based compression to produce color compression data, and the color compression data are subjected to monochrome conversion to produce monochrome compression data. However, there may be a case where a degree of reduction in the number of colors becomes different between the monochrome compression data produced in the first case and the monochrome compression data produced in the second case.

Figure 3:
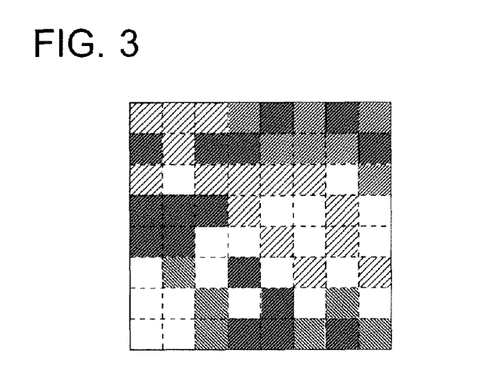
FIG. 3 is a diagram showing one example of original color image data (one block)
Figure 4:
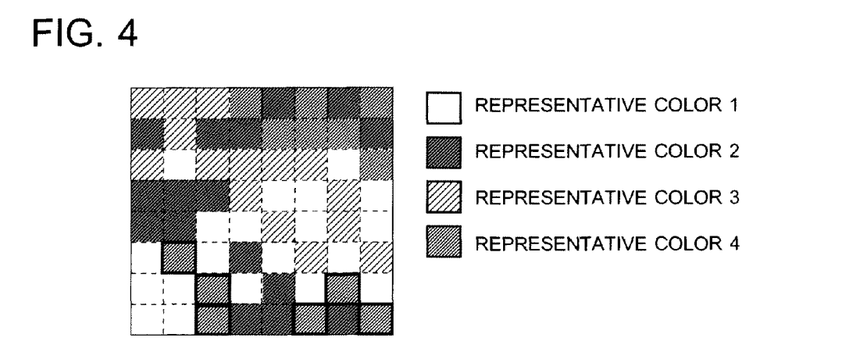
FIG. 4 is a diagram showing one example of color representative-color-based compression data produced by compressing the original color image data based on four representative colors.

For example, it is assumed that one block (8×8 pixels) of an original color image is constituted as shown in FIG. 3 (in this drawing, differences in color are expressed by respective different kinds of hatchings). In the case where this color image is compressed based on four representative colors, as shown in FIG. 4, the color of each of the pixels indicated with a thicker frame line is replaced with representative color 4. Successively, when the representative colors of the above color representative-color-based compression image are subjected to monochrome conversion, if representative color 3 and representative color 4 are judged as being the same gray level, as shown in FIG. 5, a monochrome representative-color-based compression image becomes an image compressed based on three representative colors.

Figure 5:
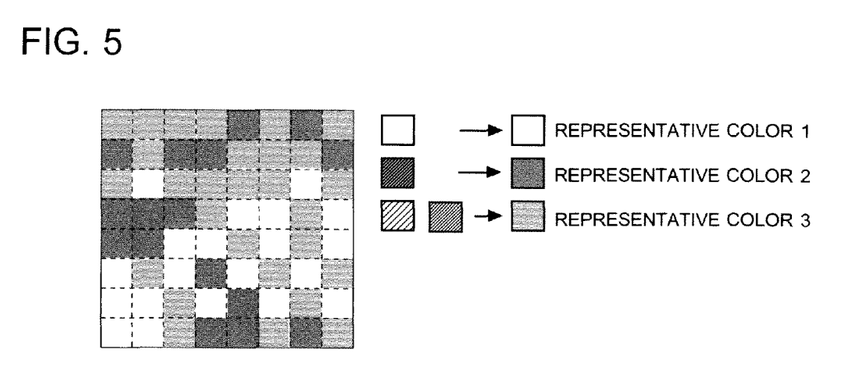
FIG. 5 is a diagram showing one example of first monochrome representative-color-based compression data produced by performing monochrome conversion for the color representative-color-based compression data.
Figure 6:
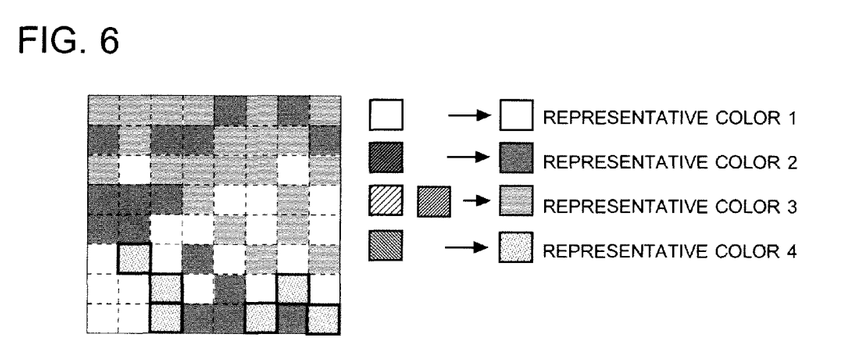
FIG. 6 is a diagram showing one example of second monochrome representative-color-based compression data produced by performing monochrome conversion for the original color image data so as to produce monochrome image data and thereafter by compressing the monochrome image data based on four representative colors.

On the other hand, in the case where the original color image is directly subjected to monochrome conversion so as to be converted into a monochrome image and, thereafter, the monochrome image is subjected to representative-color-based compression; as shown in FIG. 6, a monochrome image is supposed to be acquired based on four representative colors. Namely, in the case where a color representative-color-based compression image is subjected to monochrome conversion, image quality deterioration takes place on the portions of the representative color 3 in the image shown in FIG. 5.

In the above examples, in the image in FIG. 5 and in the image in FIG. 6, since there are colors converted into the same gray level, some differences are caused in the conversion result. However, in an actual image, whether or not a difference causes depends on the image. In an extreme example, in the case where four representative colors in representative-color-based compression for a color image belong to the same gray level, when the color image is subjected to monochrome conversion, there is a possibility that the representative color becomes a single color.

Then, in this example, when an original color image is subjected to representative-color-based compression so as to produce and output a color compression image (FIG. 4), two types of temporary monochrome compression images are produced internally, where the two types of monochrome compression images are a monochrome compression image (FIG. 5) produced through a process of performing monochrome conversion on the color compression image and a monochrome compression image (FIG. 6) produced through a process of performing monochrome conversion on the original color image to produce a monochrome image and thereafter further performing representative-color-based compression for the resulting monochrome image. Successively, difference information between the monochrome compression image shown in FIG. 5 and the monochrome compression image shown in FIG. 6 is extracted.

This difference data includes two types of information: information indicating a replacement pixel in which a representative color assigned is same as a representative color assigned to one of other pixels than the replacement pixel in the monochrome compression data of FIG. 5 and differs from a representative color assigned to the one of the other pixels in the monochrome compression data of FIG. 6, and information indicating a replacement representative color assigned to the replacement pixel in the monochrome compression data of FIG. 6. Thereby, by replacing the representative color of the replacement pixel of the monochrome compression data of FIG. 5 with the replacement representative color of the difference data, the compression data equivalent to the monochrome compression data of FIG. 6 can be generated. For example, as shown in FIG. 7, this difference information includes a block number, the reduction in number of colors, a corresponding representative color, information of reduced representative color, the number of corresponding pixels, corresponding-pixel information, and the like. In this example, since the number of representative colors is reduced from four to three, the reduction in number of colors is 1 (one). The corresponding representative color is a representative color to be assigned to each pixel the color of which was reduced or replaced. In this example, the corresponding representative color is the representative color 4. The information of reduced representative color is the color information of the representative color 4. The number of corresponding pixels is the number of pixels the color of each of which is expected to be replaced with the corresponding representative color. The corresponding-pixel information is the position information of each of pixels the color of each of which is expected to be replaced with the corresponding representative color. Further, in the case where the number of representative colors is reduced to two, as shown in FIG. 8, the difference information is configured to describe the information of reduced representative color, the number of corresponding pixels and the corresponding-pixel information for each of the corresponding representative colors. Here, each of FIGS. 7 and 8 shows one example of the difference information of this example, and if the difference information includes information necessary to restore the monochrome compression image shown in FIG. 6, it may be permissible.

Further, the difference information is outputted as a compression result with being attached to the color compression image shown in FIG. 4. With this, there are produced the color compression image shown in FIG. 4 and the difference information as image data produced in the memory at the time of regular scanning. Accordingly, as compared with both the case where the color compression image shown in FIG. 4 and the monochrome compression image shown in FIG. 6 are stored, memory resources can be saved.

Subsequently, in the case where the scanned image is processed as a color image, the difference information is discarded, and the color compression image shown in FIG. 4 is expanded so as to produce an output image. On the other hand, in the case where the scanned image is processed as a monochrome image, the color compression image shown in FIG. 4 is subjected to monochrome conversion so as to produce a monochrome compression image shown in FIG. 5, and the difference information is applied to this monochrome compression image (the corresponding representative color is assigned to each of pixels in which color reduction occurs), whereby a compression image equivalent to a monochrome compression image shown in FIG. 6 is produced, and this compression image is expanded to produce an output image. With this, image quality deterioration can be suppressed without storing the monochrome compression image shown in FIG. 6 in a memory.

Hereafter, description will be given to a constitution of an apparatus configure to realize the above control. FIG. 9 is a block diagram showing the constitution of the image processing apparatus of this example, and FIG. 10 is a block diagram showing the constitution of a compressing module incorporated in the image processing apparatus.

The image processing apparatus 10 of this embodiment may be used for a printer, scanner, MFP, and the like. As shown in FIG. 9, the image processing apparatus 10 includes a control section 10a, compressing section 10b, restoring section 10c, and processing section 10d. The processing section 10d is configured to transfer images acquired by the scanning of a manuscript to the compressing section 10b and to execute printing and the like by using an output image produced by the restoring section 10c.

The control section 10a includes a CPU (Central Processing Unit) and memories, such as a ROM (Read Only Memory) and a RAM (Random Access Memory), and the CPU is configured to develop programs stored in the ROM into the RAM and to execute the programs so as to control the entire body of the image processing apparatus 10.

The compressing section 10b is configured to divide an input image (such as an image read by an image reading section and an image acquired from other apparatus) becoming a processing target into a plurality of blocks, and to compress each of plurality of blocks based on representative colors. For examples, a compressing module in which the compressing section 10b is constituted by hardware, includes a first compressing circuit to produce color compression data from an original color image, a second compressing circuit to produce first monochrome compression data from the color compression data, a third compressing circuit to produce second monochrome compression data from the original color image, a difference data generating circuit to produce difference data by comparing the first monochrome compression data and the second monochrome compression data, and an output circuit to synthesize the color compression data and the difference data and to output the synthesized data. The specific constitution and actions of this compressing module will be described later.

The restoring section 10c is configured to restore the data outputted from the compressing section 10b and to produce data capable of being processed in a processing section 10d (printing section). For examples, an expanding module in which the restoring section 10c is constituted by hardware, includes a converting circuit to perform monochrome conversion on color compression data and thereafter, to produce monochrome compression data by applying difference data, an reversibly-expanding circuit to expand compression data, a memory to store expanded data, and a selector circuit to rearrange the blocks and to produce an output image.

The processing section 10d includes an image reading section, a printing section, and the like. The image reading section includes a light source to scan a manuscript, an image sensor, such as CCDs (Charge Coupled Devices), to convert light fluxes reflected on the manuscript into electric signals, an A-D converter to perform A/D conversion for the electric signals so as to output image data. The printing section is configured to transfer the output image produced in the restoring section 10c to a transfer sheet. Specifically, a photoreceptor drum is electrically charged by an electric charge device, and, thereafter, irradiated with light corresponding to the output image by a light-exposing device, whereby an electrostatic latent image is formed on the photoreceptor drum. Successively, toner electrically charged in a developing device is made adhere on as to develop the electrostatic latent image and to form a toner image, and, thereafter, the toner image is transferred firstly from the photoreceptor drum to a transfer belt and further transferred secondarily from the transfer belt to a paper medium. Further, in a fixing device, the toner image is fixed onto the paper medium.

FIG. 9 shows an example of the image processing apparatus 10 of this example, and its constitution may be changed appropriately. For example, in FIG. 9, although the compressing section 10b and the restoring section 10c are incorporated in a single apparatus, they may be disposed separately into respective different devices. Further, in FIG. 9, although the compressing section 10b and the restoring section 10c are disposed separately, they may be integrated into a single unit.

Next, the specific constitution of the above-mentioned compressing module will be described with reference to FIG. 10. The compressing module includes an image input buffer 11, an output mode control circuit 12, a representative color extracting circuit (C) 13, an image pixel evaluating circuit (C) 14, a first work memory 15, a representative color extracting circuit (BW) 16, an image pixel evaluating circuit (BW) 17, a second work memory 18, a representative color extracting circuit (BW2) 19, an image pixel evaluating circuit (BW2) 20, a third work memory 21, a difference data generating circuit 22, a first output buffer 23, a second output buffer 24, a third output buffer 25, a synthesizing circuit 26, and the like.

The image input buffer 11 takes in and holds input image data becoming a compression target from an image reading section or other apparatus.

The representative color extracting circuit (C) 13, the image pixel evaluating circuit (C) 14, and the first work memory 15 constitute cooperatively the above-mentioned first compression circuit, and are configured to perform representative-color-based compression to the input image data (color image data) so as to produce color compression data.

The representative color extracting circuit (BW) 16, the image pixel evaluating circuit (BW) 17, and the second work memory 18 constitute cooperatively the above-mentioned third compression circuit, and are configured to perform monochrome conversion for the input image data so as to produce monochrome image data, and thereafter, to perform representative-color-based compression on the monochrome image data so as to produce second monochrome compression data.

The representative color extracting circuit (BW2) 19, the image pixel evaluating circuit (BW2) 20, and the third work memory 21 constitute cooperatively the above-mentioned second compression circuit, and are configured to perform the monochrome conversion only of representative colors extracted at the time of production of the color compression data so as to produce first monochrome compression data.

The difference data generating circuit 22 is configured to compare the first monochrome compression data and the second monochrome compression data so as to extract differences, and to produce difference data.

The first output buffer 23, the second output buffer 24, the third output buffer 25, and the synthesizing circuit 26 constitute cooperatively the above-mentioned output circuit, and are configured to output the color compression data, the first monochrome compression data, or the color compression data and the difference data as a compression result.

An output mode control circuit 12 is configured to control the first compressing circuit, the third compressing circuit, and the output circuit to act in response to a final output mode so as to output desired data.

Next, the actions of the compressing section (compressing module) will be described with reference to flow chart diagrams shown in FIGS. 11A and 11B.

The image input buffer 11 takes in input image data becoming a compression target from an image reading section or other apparatus and stores them (S101). The input image data (target region) are, for example, block data composed of 8×8 pixels.

Next, the representative color extracting circuit (C) 13 extracts representative colors from color input image data, and the image pixel evaluating circuit (C) 14 specifies the position information of each of pixels assigned with respective representative colors and produces representative color information (C) and image pixel position information (C) as color compression data on the first work memory 15 (S102).

Next, the representative color extracting circuit (BW2) 19 performs monochrome conversion of the representative color information (C) produced on the first work memory 15 so as to extract monochrome representative color information, and the image pixel evaluating circuit (BW2) 20 specifies the position information of each of pixels assigned with respective representative colors and produces representative color information (BW2) and image pixel position information (BW2) as first monochrome compression data produced by performing monochrome conversion for the color compression data on the third work memory 21 (S103).

Further, in parallel to the production processing of the above-mentioned color compression data, the representative color extracting circuit (BW) 16 performs monochrome conversion on the input image data so as to produce monochrome input image data, and thereafter, extracts representative colors from the monochrome input image data. The image pixel evaluating circuit (BW) 17 specifies the position information of each of pixels assigned with respective representative colors and produces representative color information (BW) and image pixel position information (BW) as second monochrome compression data on the second work memory 18 (S104). At this time, if the input image data stored in the image input buffer 11 are monochrome, monochrome conversion processing is unnecessary.

Next, the difference data generating circuit 22 compares the representative color information (BW) and the image pixel position information (BW) produced on the second work memory 18 with the representative color information (BW2) and the image pixel position information (BW2) produced on the third work memory 21 and produces difference data in which various kinds of information shown in FIGS. 7 and 8 are described (S105).

Next, the output mode control circuit 12 judges whether the output mode is a color mode (whether the manuscript is judged as color, or whether the manuscript is determined to be processed as color), a monochrome mode (whether the manuscript is judged as monochrome, or whether the manuscript is determined to be processed as monochrome), or a judgment-unable mode in which either a color mode or a monochrome mode cannot be judged (S106).

When the output mode is judged as a monochrome mode, the output mode control circuit 12 sends the representative color information (BW) and the image pixel position information (BW) on the second work memory 18 to the synthesizing circuit 26 via the first output buffer 23, and the synthesizing circuit 26 outputs the monochrome compression data as a compression result (S107).

When the output mode is judged as a color mode, the output mode control circuit 12 sends the representative color information (C) and the image pixel position information (C) on the first work memory 15 to the synthesizing circuit 26 via the second output buffer 24, and the synthesizing circuit 26 outputs the color compression data as a compression result (S108).

When the output mode is unknown because the output mode cannot be judged as a color mode or a monochrome mode, the output mode control circuit 12 sends the representative color information (C) and the image pixel position information (C) on the first work memory 15 to the synthesizing circuit 26 via the second output buffer 24, and also sends difference data produced by the difference data generating circuit 22 to the synthesizing circuit 26 via the third output buffer 25. Successively, the synthesizing circuit 26 outputs these data as a compression result (S109).

Thereafter, upon receipt of the monochrome compression data from the compressing module (compressing section 10b), the restoring section 10c expand the monochrome compression data so as to produce a monochrome output image, or, upon receipt of only the color compression data, the restoring section 10c expand the color compression data so as to produce a color output image.

Alternatively, as shown in FIG. 11B, when the restoring section 10c receives the color compression data and the difference data from the compressing module (compressing section 10b) (S201), the restoring section 10c follows the result of the color/monochrome judgment (S202). Accordingly, when the color/monochrome judgment results in a color mode, the restoring section 10c expands the color compression data so as to produce a color output image (S203). On the other hand, when the color/monochrome judgment results in a monochrome mode, the restoring section 10e performs monochrome conversion of the representative colors extracted from the color compression data so as to produce monochrome compression data (first monochrome compression data) (S204), applies the difference data to the produced monochrome compression data so as to produce monochrome compression data equivalent to the second monochrome compression data (S205), and expand the finally-produced monochrome compression data so as to produce a monochrome output image (S206).

Subsequently, the processing section 10d (printing section) performs printing processing based on the output image.

In this way, when the final output cannot be judged as a color mode or a monochrome mode, color compression data and difference data are output. Successively, when the final output is outputted as a monochrome mode, monochrome compression data equivalent to the second monochrome compression data produced through a process of performing directly monochrome conversion for the original color image are produced by use of the color compression data and the difference data, whereby memory resources can be saved and it becomes possible to suppress the deterioration of image quality.

SECOND EXAMPLE

Next, description will be given to an image processing apparatus and image processing method pertaining to the second embodiment of the present invention with reference to FIGS. 12 and 13. Each of FIGS. 12 and 13 is an illustration showing a constitution and general action of a system of this example.

In the above-mentioned first example, description has been given to the image forming apparatus in which the apparatus configured to produce compression data and the apparatus configured to use the compressed data are constituted integrally in a single body. However, there may be a case where an image displayed on a first apparatus is required to be displayed on a second apparatus and the image is further required to be printed in a hard copy. Even in such a case, it is necessary to reduce an amount of data to be transferred from the first apparatus to the second apparatus.

Figure 12:
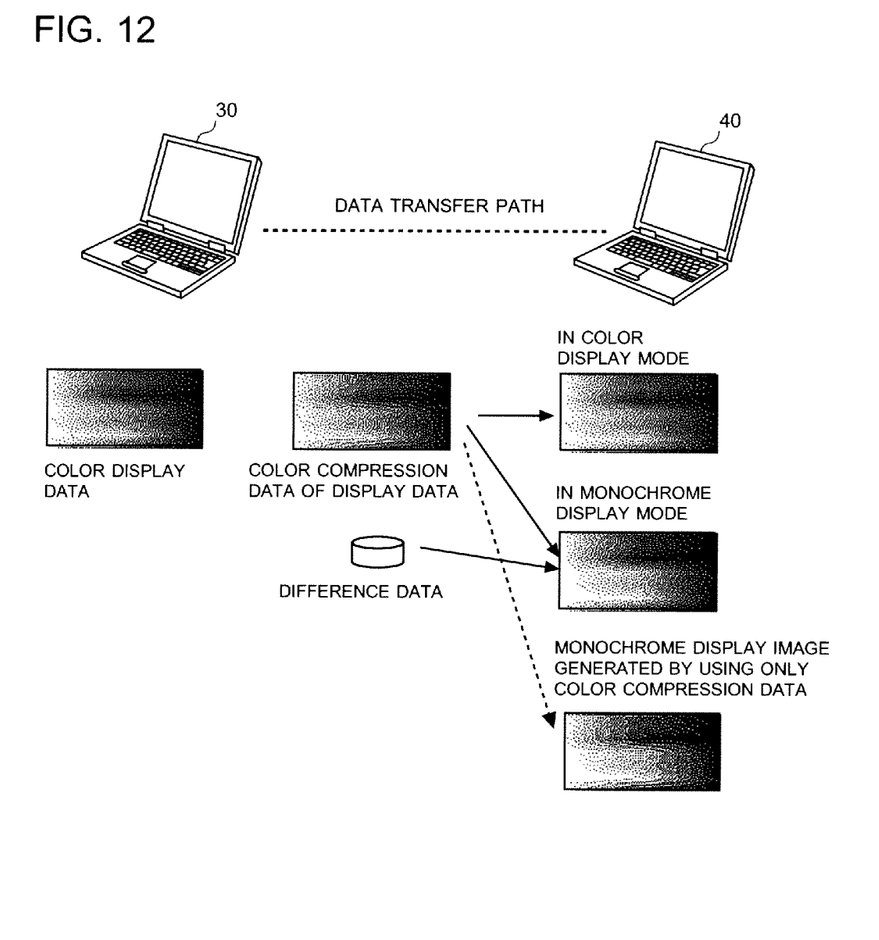
FIG. 12 is an illustration showing one example of a constitution and general action of a system pertaining to the second example of the present invention.
Figure 13:
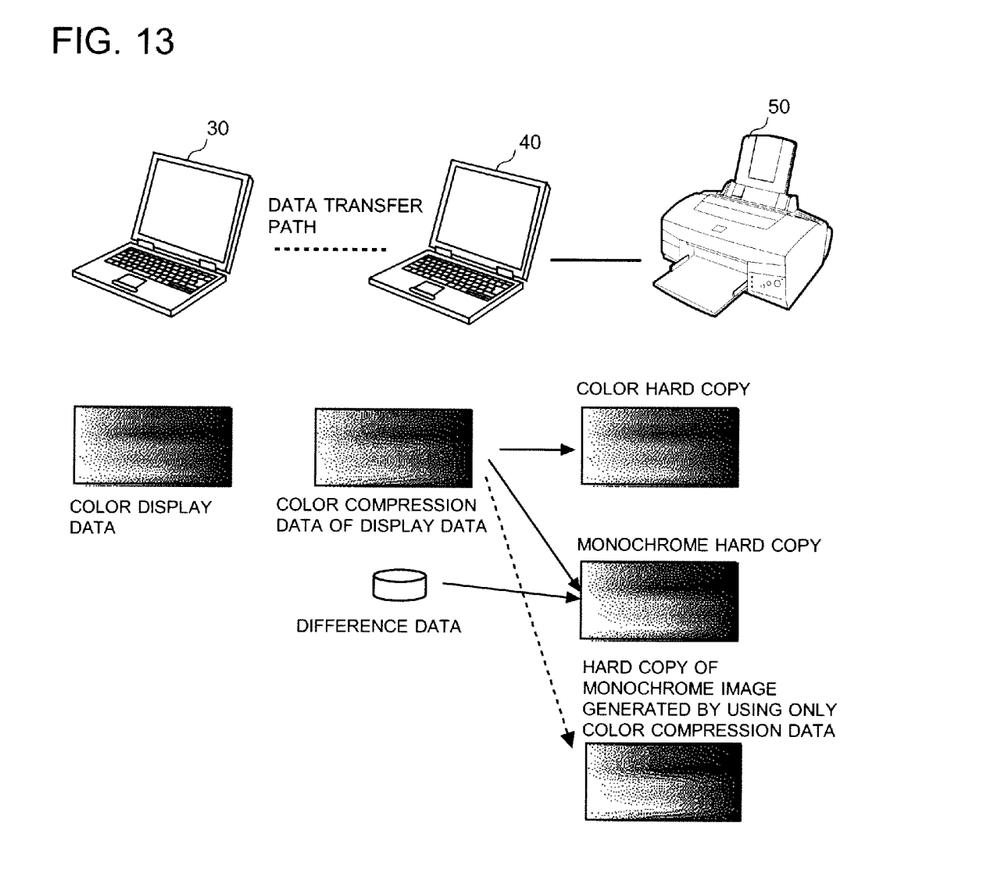
FIG. 13 is an illustration showing another example of a constitution and general action of a system pertaining to the second example of the present invention.

For example, as shown in FIG. 12, a first computer apparatus 30 and a second computer apparatus 40 are connected to each other through a data transfer path, and an image of a screen displayed in the first computer apparatus 30 is supposed to be displayed also in the second computer apparatus 40. In such a system, in order to reduce a transfer load on the data transfer path, the first computer apparatus 30 produces compression data from its display data by the using representative-color-based compression method and transfers the compression data to the second computer apparatus 40. Then, the second computer apparatus 40 expands the compression data and uses the expanded data as display data.

At this time, in the case where the situation that the second computer apparatus 40 is expected to perform color display is known beforehand, it may be convenient to transfer color compression data produced through a process of compressing the display data based on representative colors. Further, in the case where the situation that the second computer apparatus 40 is expected to perform monochrome display is known beforehand, it may be convenient that the first computer apparatus 30 performs monochrome conversion on the display data to produce monochrome display data, produces monochrome compression data by performing representative-color-based compression on the monochrome display data, and transfer the monochrome compression data. However, in the case where it is not determined that the second computer apparatus 40 performs which one of a color display mode and a monochrome display mode, if both the color compression data and the monochrome compression data are transferred, an amount of data to be transferred increases.

Then, in such a case, as with the first example, the first computer apparatus 30 produces color compression data and difference data, and transfers them to the second computer apparatus 40. Successively, when the color display mode is to be performed, the second computer apparatus 40 expands the color compression data so as to produce a color display image. On the other hand, when a monochrome display mode is to be performed, the second computer apparatus 40 produces monochrome compression data by using both the color compression data and the difference data and expands the monochrome compression data so as to produce a monochrome display image. With this, it becomes possible to prevent image quality deterioration as with a monochrome display image (refer to an image shown at a right-lower side in FIG. 12) produced by using only the color compression data.

Further, as shown in FIG. 13, there may be a case where a printer 50 is connected to the second computer apparatus 40 and an image of a screen currently displayed on the second computer apparatus 40 is required to be outputted as a hard copy. Also, in this case, in the case where a color hard copy is required to be outputted by the printer 50, color compression data may be used. However, in the case where a monochrome hard copy is required to be outputted, compression data produced though a process of performing monochrome conversion for the color compression data are used, the image quality of the monochrome hard copy may deteriorate.

Then, also in such a case, as with the first example, the first computer apparatus 30 generates color compression data and difference data, and transfers them to the second computer apparatus 40. Successively, when a monochrome hard copy is to be outputted by the printer 50, the second computer apparatus 40 produces monochrome compression data by using both the color compression data and the difference data and extends the produced monochrome compression data on as to produce a monochrome display image, whereby a monochrome hard copy is outputted based on the monochrome display image. With this, it becomes possible to prevent image quality deterioration as with a monochrome hard copy (refer to an image shown at a right-lower side in FIG. 13) printed by using only the color compression data.

In this way, in the case where the apparatus configured to generate compression data and the apparatus configured to use the compression data are separated from each other and it is not determined that the final output is produced in a color mode or a monochrome mode, with a technique to output both color compression data and difference data, an amount of data to be transferred can be reduced, and when a monochrome image is to be outputted, it becomes possible to prevent image quality deterioration.

While the present examples of the present invention have been described using specific terms, such description is for illustrative purpose only, and it is to be understood that changes and variations may be made without depending from the spirit or scope of the appended claims.

For example, description has been given to the scanned data in the first example and to the display data in the second example. However, data used as a compression data should not be limited to the above data. Further, description has been given to the representative-color-based compression in the case where the number of representative colors is four. However, the number of representative colors should not be limited to four.

The invention claimed is:

1. An image processing apparatus, comprising:
a compressing circuit configured to perform operations comprising:
generating color compression data by performing a representative-color-based compression on a color input image;
generating first monochrome compression data by performing a monochrome conversion of representative colors extracted in the generating the color compression data;
generating second monochrome compression data by performing a monochrome conversion and then a representative-color-based compression on the color input image;
generating difference data by comparing the first monochrome compression data and the second monochrome compression data; and
outputting the color compression data and the difference data,
wherein the performing the representative-color-based compression includes dividing an image to be compressed into a plurality of blocks, extracting representative colors from each of the blocks, and assigning each pixel in the blocks one of the representative colors.

2. The image processing apparatus of claim 1, further comprising
a restoring circuit configured to perform operations comprising:
receiving the color compression data and the difference data;
under a condition that the input image is to be outputted in color, expanding the color compression data to generate an output image; and
under a condition that the input image is to be outputted in monochrome,
generating the first monochrome compression data by performing a monochrome conversion of the representative colors of the color compression data, generating a compression data equivalent to the second monochrome compression data by applying the difference data to the first monochrome compression data, and expanding the compression data to generate an output image.

3. The image processing apparatus of claim 2,
wherein the difference data includes
information indicating a replacement pixel in which a representative color assigned is same as a representative color assigned to one of other pixels than the replacement pixel in the first monochrome compression data and differs from a representative color assigned to the one of the other pixels in the second monochrome compression data, and
information indicating a replacement representative color assigned to the replacement pixel in the second monochrome compression data, and
the restoring circuit is configured to, in the applying the difference data to the first monochrome compression data, replace the representative color of the replacement pixel of the first monochrome compression data with the replacement representative color of the difference data to generate the compression data equivalent to the second monochrome compression data.

4. The image processing apparatus of claim 2, further comprising an image reader including a light source and image sensor, the reader being configured to obtain a scanned image, and a memory, so as to work as an image forming apparatus,
wherein the compressing circuit is configured to perform operations including
receiving the scanned image as the color input image to generate the color compression data and the difference data, and
storing the color compression data and the difference data into the memory, and the restoring circuit is configured to perform operations including
reading the color compression data and the difference data from the memory and
generating the output image by using the color compression data, or by using the color compression data and the difference data, depending on whether an output mode of the scanned image is color or monochrome.

5. An image processing method comprising performing compressing operations and restoring operations,
the compressing operations including:
generating color compression data by performing a representative-color-based compression on a color input image;
generating first monochrome compression data by performing a monochrome conversion of representative colors extracted in the generating the color compression data;
generating second monochrome compression data by performing a monochrome conversion and then a representative-color-based compression on the color input image;
generating difference data by comparing the first monochrome compression data and the second monochrome compression data; and
outputting the color compression data and the difference data,
wherein the performing the representative-color-based compression includes dividing an image to be compressed into a plurality of blocks, extracting representative colors from each of the blocks, and assigning one of the representative colors to each pixel in the blocks, and
the restoring operations including:
receiving the color compression data and the difference data;
under a condition that the input image is to be outputted in color, expanding the color compression data to generate an output image; and
under a condition that the input image is to be outputted in monochrome, generating the first monochrome compression data by performing a monochrome conversion of the representative colors of the color compression data, generating a compression data equivalent to the second monochrome compression data by applying the difference data to the first monochrome compression data, and expanding the compression data to generate an output image.

6. The image processing method of claim 5,
wherein the difference data includes
information indicating a replacement pixel in which a representative color assigned is same as a representative color assigned to one of other pixels than the replacement pixel in the first monochrome compression data and differs from a representative color assigned to the one of the other pixels in the second monochrome compression data, and information indicating a replacement representative color assigned to the replacement pixel in the second monochrome compression data, and the performing the restoring operations includes, in the applying the difference data to the first monochrome compression data, replacing the representative color of the replacement pixel of the first monochrome compression data with the replacement representative color of the difference data to generate the compression data equivalent to the second monochrome compression data.

7. The image processing method of claim 5, comprising:

operating an image forming apparatus including a compressing circuit, a restoring circuit, an image reading section and a memory, to perform the compressing operations and the restoring operations, wherein the performing the compressing operations includes receiving the scanned image as the color input image to generate the color compression data and the difference data, and storing the color compression data and the difference data into the memory, and the performing the restoring operations includes reading the color compression data and the difference data from the memory and generating the output image by using the color compression data or by using the color compression data and the difference data, depending on whether an output mode of the scanned image is a color display mode or a monochrome display mode.

8. The image processing method of claim 5, comprising:

operating a first computer apparatus to perform the compressing operations by using an image displayed in the first computer apparatus as the color input image; and operating a second computer apparatus connected to the first computer apparatus through a data transfer path, to perform the restoring operations, wherein the performing the compressing operations includes:

generating the color compression data and the difference data based on the image displayed in the first computer apparatus, and transmitting the color compression data and the difference data to the second computer apparatus, and the restoring the compression data includes:

receiving the color compression data and the difference data from the first computer apparatus; and generating the output image by using the color compression data, or by using the color compression data and the difference data, depending on whether an output mode of the image displayed in the first computer apparatus is a color display mode or a monochrome display mode.

9. The image processing method of claim 8, comprising:

operating the second computer apparatus to perform the restoring operations, the second computer apparatus being connected to a printer, wherein the performing the restoring operations includes generating the output image by using the color compression data, or by using the color compression data and the difference data, depending on whether the output mode of the image displayed in the first computer apparatus is a color hard copy or a monochrome hard copy.

* * * * *